(12) United States Patent
Glater

(10) Patent No.: US 7,377,589 B1
(45) Date of Patent: May 27, 2008

(54) INTERCHANGEABLE SEAT CUSHIONS FOR AUTOMOTIVE BUCKET SEATS

(76) Inventor: Irving W. Glater, 277 N. Quaker La., West Hartford, CT (US) 06119-1036

( * ) Notice: Subject to any disclaimer, the term of this patent is extended or adjusted under 35 U.S.C. 154(b) by 428 days.

(21) Appl. No.: 11/114,967

(22) Filed: Apr. 26, 2005

Related U.S. Application Data

(63) Continuation-in-part of application No. 10/360,682, filed on Feb. 8, 2003, now abandoned.

(60) Provisional application No. 60/356,606, filed on Feb. 13, 2002.

(51) Int. Cl.
*A47C 7/00* (2006.01)
*B60N 2/02* (2006.01)

(52) U.S. Cl. .................. 297/440.14; 297/338

(58) Field of Classification Search ........... 297/440.22, 297/440.1, 440.14, 344.1, 338

See application file for complete search history.

(56) References Cited

U.S. PATENT DOCUMENTS

| | | | | |
|---|---|---|---|---|
| 4,065,182 A | * | 12/1977 | Braniff et al. | 297/440.22 |
| 4,079,994 A | * | 3/1978 | Kehl | 297/440.22 |
| 6,135,562 A | * | 10/2000 | Infanti | 297/440.2 |
| 6,616,233 B1 | * | 9/2003 | Debus et al. | 297/341 |
| 6,637,823 B1 | * | 10/2003 | Ursini et al. | 297/440.2 |
| 2003/0122407 A1 | * | 7/2003 | Boyd et al. | 297/130 |

* cited by examiner

*Primary Examiner*—Milton Nelson, Jr.
(74) *Attorney, Agent, or Firm*—John V. Stewart

(57) ABSTRACT

An automotive bucket seat with a frame, a back cushion mounted on the frame, a bottom cushion removably mounted on the frame, and a set of interchangeable bottom cushions in a range of lengths that are alternately mountable on the frame. A tool-less releasable attachment mechanism provides fast but secure interchange of cushions. This provides a bucket seat that properly fits users of different sizes.

13 Claims, 5 Drawing Sheets

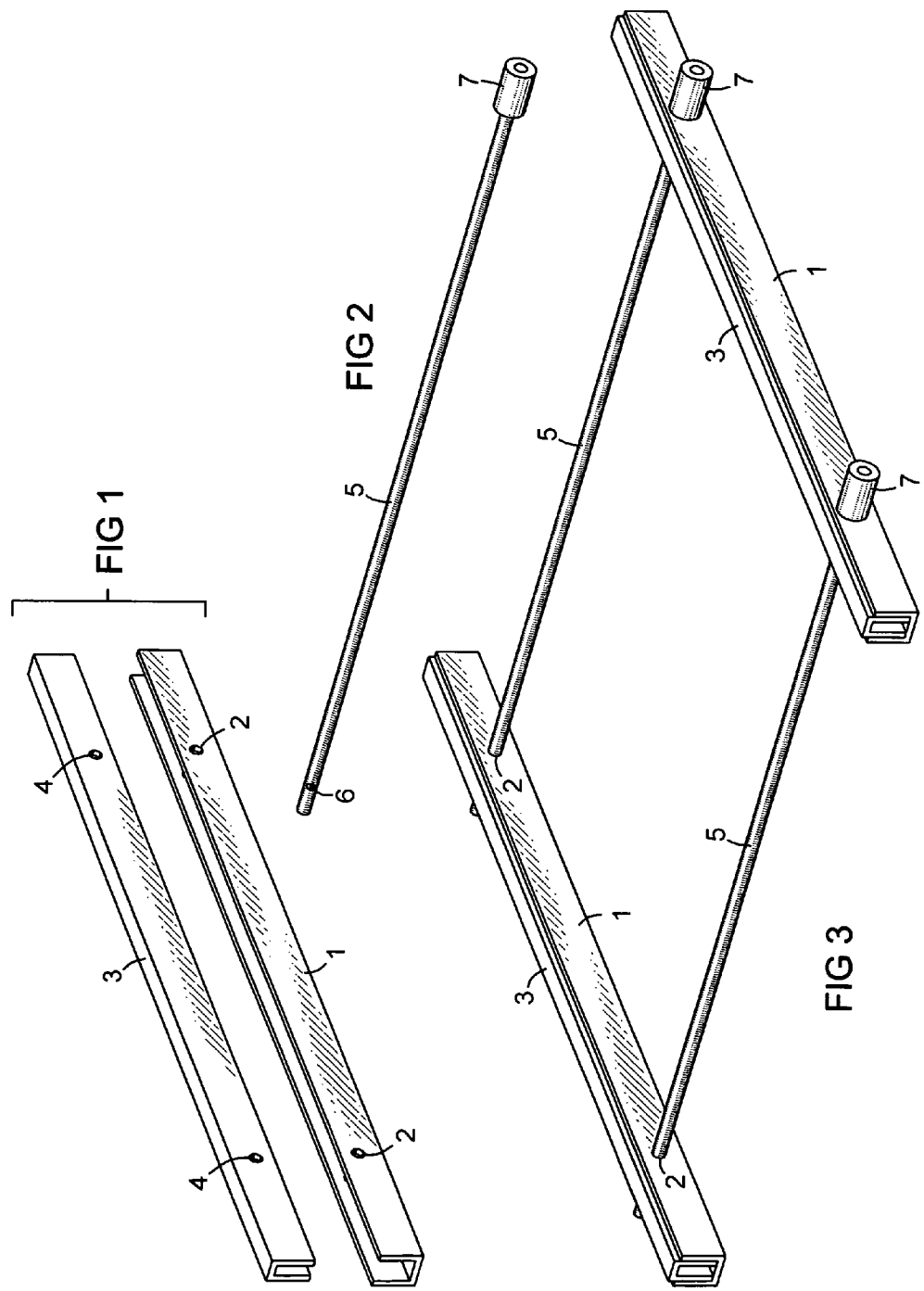

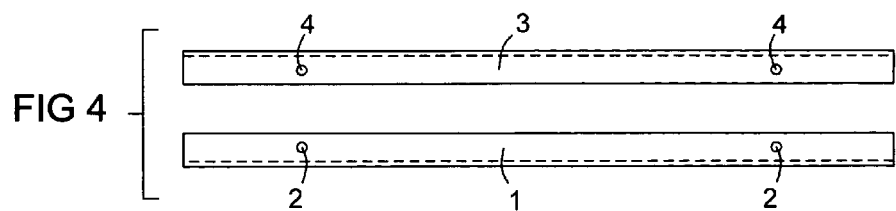
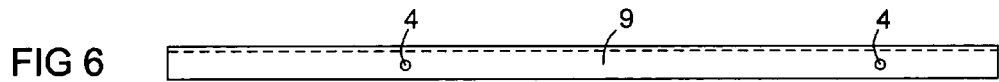
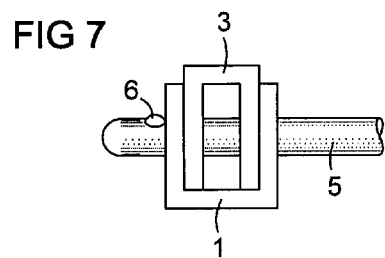
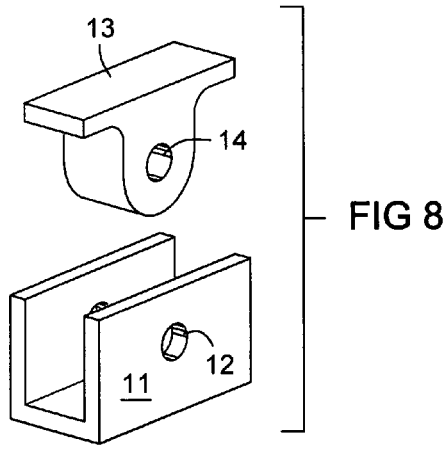
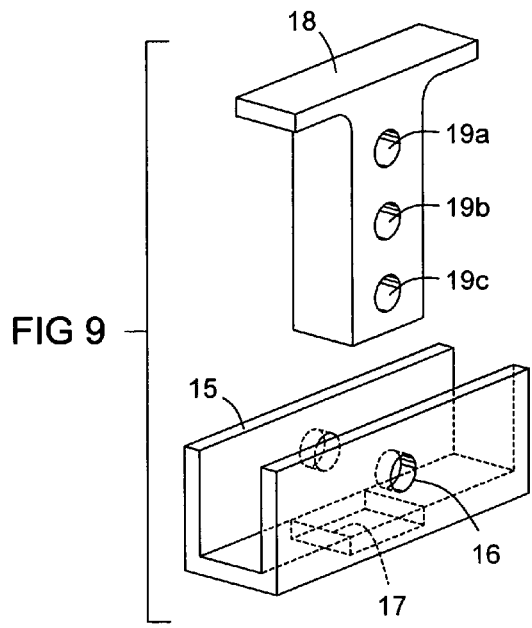

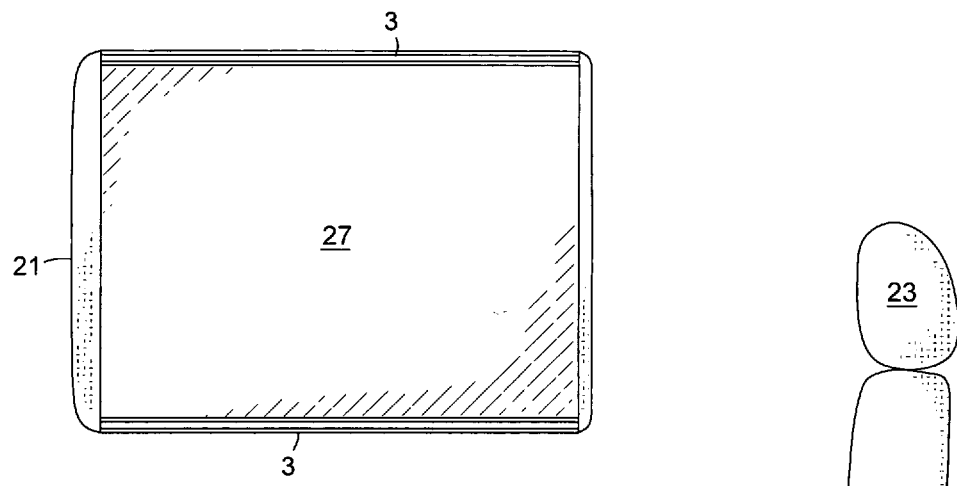
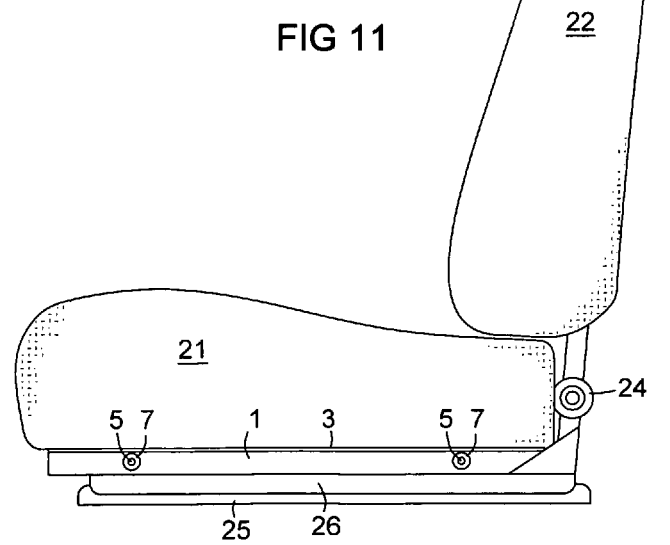

FIG 13

Upper leg length in centimeters for males 20 years and over: U.S. 1988 - 1994

| No. of examined persons | Selected Percentile | | | | | | | | |
|---|---|---|---|---|---|---|---|---|---|
| | 5th | 10th | 15th | 25th | 50th | 75th | 85th | 90th | 95th |
| 7,405 | 37.0 | 38.1 | 39.0 | 40.1 | 42.2 | 44.5 | 45.6 | 46.6 | 47.8 |

FIG 14

Upper leg length in centimeters for females 20 years and over: U.S. 1988 - 1994

| No. of examined persons | Selected Percentile | | | | | | | | |
|---|---|---|---|---|---|---|---|---|---|
| | 5th | 10th | 15th | 25th | 50th | 75th | 85th | 90th | 95th |
| 8,337 | 33.1 | 34.5 | 35.4 | 36.6 | 38.7 | 40.9 | 42.0 | 42.6 | 43.9 |

INTERCHANGEABLE SEAT CUSHIONS FOR AUTOMOTIVE BUCKET SEATS

CROSS-REFERENCE TO RELATED APPLICATIONS

This application is a continuation-in-part of U.S. patent application Ser. No. 10/360,682 filed Feb. 8, 2003, now abandoned which claims the benefit of provisional patent application 60/356,606 filed Feb. 13, 2002.

BACKGROUND

1. Field of the Invention

This invention relates to automotive bucket seats with a bottom cushion that is interchangeable to accommodate different sized users.

2. Background of the invention

Current auto industry practice with regard to sizing automotive bucket seats is that "one size fits all". Accordingly, bucket seat design is guided by ergonomic data favoring drivers with average statures, and the seat bottom cushion must be short enough for most short drivers. This leaves larger statured drivers and/or front seat passengers, and even some very short people, at a disadvantage relative to the level of comfort that they experience on long trips. Short drivers sometimes must place cushions behind their backs so their knees bend over the front edge of the seat bottom cushion. In addition, a one-size-fits-all seat bottom cushion is often too low for optimum vision of short drivers over the dash, reducing both driving comfort and safety.

Comfort is proportional to how well the torso/arms/head weight is reacted through the buttocks and upper legs into the seat bottom cushions. This can be quantified as pounds of body weight per square inch (psi) of contact area of the legs and buttocks on the seat bottom cushion. If three or four inches of a person's upper legs are unsupported by the seat bottom cushion, the remainder of the upper legs and buttocks must support the entire torso/arms/head weight. The unit pressure (psi) on this reduced area is higher than would be the case if the entire upper legs were supported. The result is an earlier onset and a higher level of discomfort during a long trip.

SUMMARY OF THE INVENTION

A main object of the invention is to provide an automotive bucket seat that properly fits the user. Another object is to provide a mechanism to easily interchange the bottom cushion of an automotive bucket seat with a selection from a set of interchangeable bottom cushions in a range of lengths for different sized users.

These objects are achieved in an automotive bucket seat with a frame, a back cushion mounted on the frame, a bottom cushion removably mounted on the frame, and a set of interchangeable bottom cushions in a range of lengths that are alternately mountable on the frame.

BRIEF DESCRIPTION OF THE DRAWINGS

FIG. 1 is a perspective view of mating male and female U-channels for the preferred embodiment of the invention.

FIG. 2 is a perspective view of a long pin with a detent and grip.

FIG. 3 is a perspective view of the U-channel embodiment configured as installed, less the seat parts.

FIG. 4 is a side view of the U-channels of FIG. 1.

FIG. 5 is a side view of a second male U-channel, longer than the first one.

FIG. 6 is a side view of a third male U-channel, longer than the second one.

FIG. 7 is a front view of the inboard U-channels of FIG. 3.

FIG. 8 is a perspective view of a second embodiment of the quick-connect hardware.

FIG. 9 is a perspective view of a third embodiment of the quick-connect hardware that provides vertical adjustment.

FIG. 10 is a bottom view of an interchangeable seat bottom cushion.

FIG. 11 is a side view of an automotive bucket seat configured for average leg length.

FIG. 13 A table of upper leg lengths in centimeters for males 20 years and over in the U.S. during 1988-1994.

FIG. 14 A table of upper leg lengths in centimeters for females 20 years and over in the U.S. during 1988-1994.

REFERENCE NUMERALS

Figure 12:
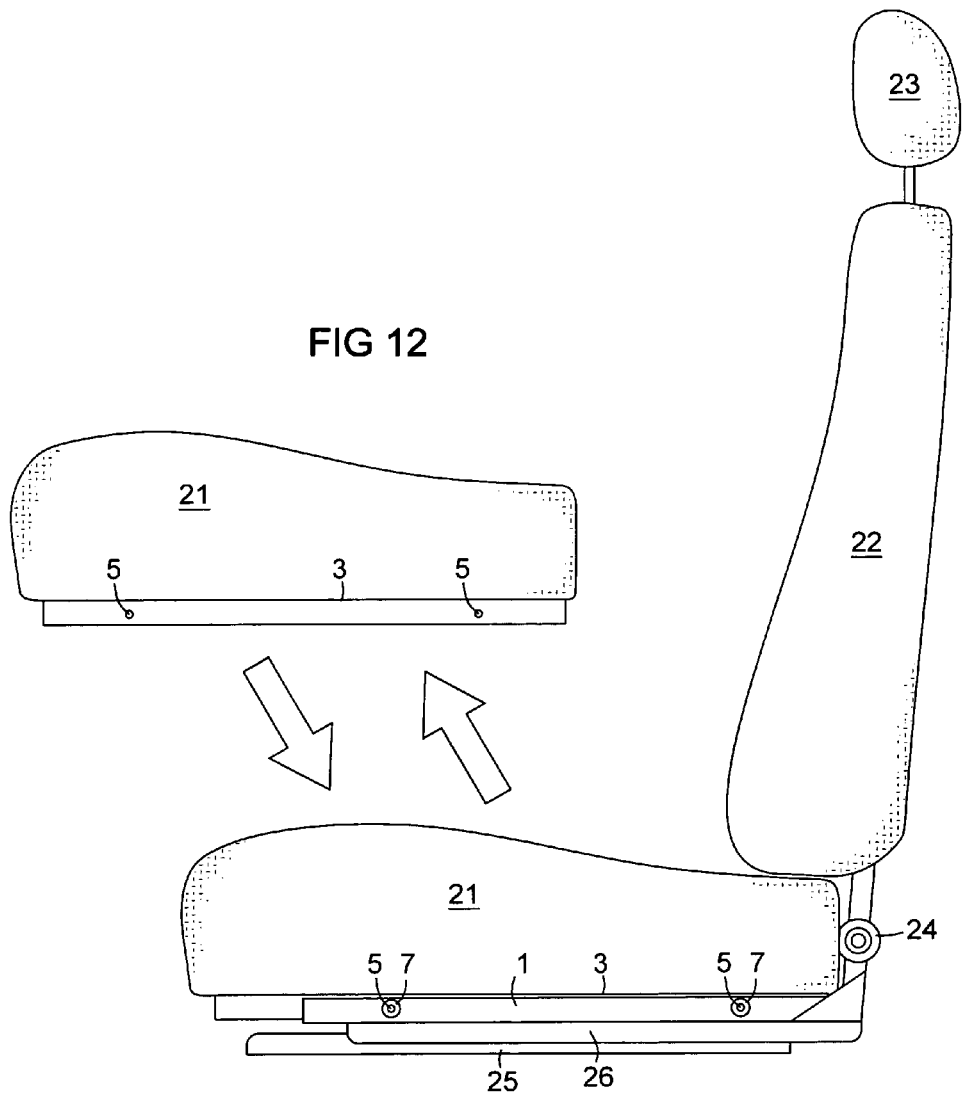
FIG. 12 is a side view of an automotive bucket seat configured for long leg length after exchange with a seat bottom cushion for average leg length.

1. Female U-channel
2. Pin hole in female U-channel
3. First male U-channel
4. Pin hole in male U-channel
5. Detent pin for connecting male and female elements
6. Detent mechanism, such as spring loaded ball
7. Grip on end of connecting pin
8. Second male U-channel, longer than the first
9. Third male U-channel, longer than the second
11. Female clevis fitting
12. Pin hole in female clevis fitting
13. Male clevis fitting
14. Pin hole in male clevis fitting
15. Female clevis fitting with pass-through
16. Pin hole in female clevis fitting with pass-through
17. Pass-through slot in female clevis fitting
18. Male clevis fitting with vertical adjustment holes
19a. First vertical adjustment hole
19b. Second vertical adjustment hole
19c. Third vertical adjustment hole
21. Seat bottom cushion
22. Seat back
23. Seat headrest
24. Seat tilt adjustment mechanism
25. Seat track attached to floor pan of vehicle
26. Slidable seat base mounted on seat track for forward and backward seat adjustment
27. Rigid bottom plate of seat bottom cushion

DETAILED DESCRIPTION

To better accommodating ergonomic differences among the population, a bucket seat design is disclosed that has a standardized base and seat back that can readily accommodate any of a series of seat bottom cushions that vary primarily in their fore-aft length. A "standard" seat bottom cushion, such as is currently manufactured, can be provided, but shorter and longer seat bottom cushions can also be offered to custom fit a seat occupant. Easy assembly and disassembly is incorporated into the present bucket seat design, so that custom seat bottom cushion fitting can be done as readily in the dealer's shop as at the factory. Further, when used vehicles are sold, their bucket seat bottom cushions can be readily changed to fit their new drivers.

The present bucket seat design accommodates the fact that the longer seat bottom cushions will overhang the seat base; hence, portions of such cushions are cantilevered forward from the base. This must be considered in the design of the interchangeable seat bottom cushions. For this reason, an elongated U-channel embodiment as shown in all figures except FIGS. 8 and 9 is the preferred embodiment, since the male U-channel 3 provides stiffness under the projecting portion of the seat bottom cushion. Preferably, the seat base matches the length of the shortest cushion so that the seat base does not extend forward of the shortest seat bottom cushion.

In order to achieve easy interchangeability of variable sized automotive bucket seat bottom cushions, the seat bottom cushions should have quick-disconnect fittings, and should include stiffness elements that can be cantilevered out from the front edge of the seat base.

A rigid, plate-like element can serve as the seat cushion bottom structure. This can be metallic (e.g. steel), or non-metallic (e.g. reinforced polymer). The metallic option has the advantage of allowing fittings to be attached by resistance or fusion welding. Otherwise, fasteners, such as rivets can be used. While the simplest approach is to use a flat, solid plate, other options include deformations (e.g. corrugations) or cutouts for stiffness, weight, or other considerations. An alternative seat cushion bottom is a rigid perimeter frame.

The seat base 26 (FIGS. 11 and 12) of the bucket seat assembly is modified to include, or accept attachment of, quick-connect elements such as female U-channels 1. In order to fully implement the capabilities of this invention, the fore-aft dimension of the bucket seat base is preferably shortened to accommodate seat bottom cushions whose fore-aft dimensions are shorter than standard one-size-fits-all. The locations of the female elements on the seat base determine where the corresponding mating male elements are affixed to the cushion bottom.

A seat bottom cushion with four male clevis fittings 13 near its bottom corners can be dropped onto mating female clevis fittings 11 on the bucket seat base. Two long pins with ball detents at their ends are then pushed through the fittings from the outboard side to rigidly join the cushion to the base.

Three different mechanisms are shown as examples for implementing this invention:
(1) As shown in all figures except FIGS. 8 and 9: Elongated U-channel sections, such as male U-channel 3 in FIG. 1, can be attached to each side of the seat cushion bottom, with the opening pointing downward. This nests into a wider U-channel, such as female U-channel 3 of FIG. 1, with its opening pointing up, attached to the seat base 26. The transverse holes in both male and female elements are located such that when they are nested and aligned, long detent pins 5 join them. This is the preferred embodiment.
(2) As shown in FIG. 8: Four separate, male clevis fittings 13 are attached near the four corners of the seat bottom. Mating female clevis fittings 11 are appropriately attached to the seat base, such that when all are mated, two detent pins 5 join them.
(3) As shown in FIG. 9: A variation of the second embodiment above allows for changing the inclination of the seat bottom cushion by providing a long-tongued male clevis fitting 18 at each front corner of the seat bottom. The tongue has a series of transverse holes 19a, 19b, 19c whose centers are located on an arc coinciding with the radius from the rear attachment hole. A mating female element 15 includes a slot in the bottom of the "U" to allow the passage of the male element, up and down.

With any of these embodiments, the vertical positions of the male and female fittings can be reversed from those shown. Thus, the male fitting can be either above or below the female fitting. These fittings can optionally be made integral with the seat base 26 and/or the seat bottom plate or peripheral frame, or the fittings can be attached with bolts, rivets, welding, or other attachment means.

If this invention is applied to bucket seats whose cushions contain electrical elements (e.g. heating), provision should be made for an electrical quick-connect, so that rapid, easy removal/installation of the cushion is not compromised.

A reasonable range of seat bottom cushion lengths for adults is part of this invention. Human body dimensional data is compiled in the National Health and Nutrition Examination Survey by the National Center for Health Statistics, which is part of the U.S. Centers for Disease Control (CDC). For the latest available reporting period of 1988-1994, the range of upper leg lengths from the 5th to 95th percentiles for U.S. adults over 20 years of age is from 33.1 cm to 47.8 cm, or about 13.0 to 18.8 inches. The difference is 14.7 cm or about 5.8 inches. Thus, an interchangeable set of seat bottom cushions of different lengths for different sized automobile drivers in the U.S. should have a range of lengths differing by at least a substantial part of 5.8 inches. Summaries of the relevant CDC survey data are shown in FIGS. 13 and 14.

A set of interchangeable seat bottom cushions preferably includes an average size, plus 1.5 inches shorter than average, and 1.5, 3.0 and 4.5 inches longer than average. The length of the seat base preferably matches that of the shortest cushion, so that the longest cushion will extend beyond the seat base by about 6 inches. Shorter-than-average cushions can preferably be made thicker than average in order to elevate the line-of-sight of short statured drivers.

A major feature of this invention is that the bulk of the bucket seat assembly, including the base, seat back and power adjusting hardware can be standardized. The only variable is the seat bottom cushion. The ease of assembly/disassembly is another major feature. No tools are needed, and it can be done as easily in a vehicle owner's driveway as in a dealer's service department or in a factory.

Optionally (not shown), a single removable seat bottom cushion can be provided with U-channel quick-connect fittings that have multiple sets of pin holes in the upper and/or lower U-channels in a longitudinal sequence. This allows the seat bottom cushion to be positioned forward or backward relative to the seat back for taller and shorter drivers respectively. The back end of the seat bottom cushion slides under the seat back in the backward position, and comes close to the front side of the seat back in the forward position. Multiple sets of pin holes can be provided in addition to larger and smaller seat bottom cushions to provide fine tuning of the leg length fit, and/or to reduce the number of cushion sizes needed in inventory.

In place of U-channels, other types of track-and-slide fittings may be used, as long as they allow the seat bottom cushion to be lowered into place. The inboard fitting does not necessarily have to be the same as the outboard fitting. For example the outboard fitting may be a male/female U-channel pair as shown, and the inboard fitting may have an inward-facing U-channel on the bottom and an outward facing U-channel on top. To install the seat bottom cushion in this embodiment the upper inboard U-channel is first hooked over the lower inboard U-channel, then the upper outboard U-channel is lowered into the lower outboard U-channel. This embodiment allows shorter pins to be used that extend only through the outboard fittings.

Although the present invention has been described herein with respect to preferred embodiments, it will be understood that the foregoing description and the attached drawings are intended to be illustrative, not restrictive. Many modifications of the present invention will occur to those skilled in the art.

I claim:

1. An automotive bucket seat with interchangeable seat cushions, comprising:
   a seat frame with a seat base having a length and a front end;
   a back cushion attached to the frame;
   a first bottom cushion releasably mounted on the seat base, the first bottom cushion being one of a set of at least two interchangeable bottom cushions of different lengths for different sized users, including a shortest bottom cushion and a longest bottom cushion, each bottom cushion interchangeably releasably mountable on the seat base, each bottom cushion having a front end;
   whereby the first bottom cushion can be selected from a range of lengths, and attached to the frame to customize the seat to properly fit a given user.

2. The bucket seat of claim 1 wherein the shortest cushion and the longest cushion differ from each other in length by at least 4 inches, and the longest cushion when installed on the seat base extends forward of the seat base by at least 3 inches.

3. The bucket seat of claim 2 wherein the front end of the seat base does not extend significantly forward of the front end of the shortest bottom cushion when the shortest bottom cushion is installed on the seat base.

4. The bucket seat of claim 1 wherein the set of interchangeable bottom cushions comprises:
   a first bottom cushion designed for a predetermined average-sized user;
   a second cushion that is at least 1 inch shorter than the first cushion; and
   at least two bottom cushions longer than the first bottom cushion, the longest of the bottom cushions being at least 3 inches longer than the first bottom cushion.

5. The bucket seat of claim 1 wherein the frame has a generally horizontal seat base with at least one left lower mounting member and at least one right lower mounting member, each of the seat bottom cushions in the set has a bottom with at least one left upper mounting member and at least one right upper mounting member, the upper mounting members on each seat bottom cushion correspond with, and mate with, the lower mounting members on the frame, the set of all upper and lower mounting members when mated has at least two aligned holes therein passing from left to right for pins, and further comprising at least two retaining pins for insertion through the aligned holes that releasably fix the upper mounting members to the lower mounting members.

6. The bucket seat of claim 1 wherein the frame has a generally horizontal seat base with a left lower elongated U-channel and a right lower elongated U-channel, each of the seat bottom cushions in the set has a bottom structure with a left upper elongated U-channel and a right upper elongated U-channel, the upper U-channels on each seat bottom cushion mate with the respective lower U-channels on the seat base, the upper and lower U-channels when mated have at least two aligned holes therein passing from left to right for pins, and further comprising at least two elongated retaining pins for inserting through the aligned holes that releasably fix the upper U-channels to the lower U-channels.

7. An automotive bucket seat with interchangeable seat cushions, comprising:
   a seat frame;
   a generally horizontal seat base on the frame with a front and back end, left and right sides;
   at least one left lower coupling mechanism and at least one right lower coupling mechanism attached to the seat base;
   a back cushion attached to the frame;
   a first bottom cushion releasably mounted on the seat base, the first bottom cushion being one of a set of at least two bottom cushions of different lengths for different sized users, including a shortest bottom cushion and a longest bottom cushion, each bottom cushion having a front end, at least one of the bottom cushions of the set extending forward from the seat base when mounted to it;
   each bottom cushion having a rigid bottom structure with a front and back end, left and right sides, at least one left upper coupling mechanism and at least one right upper coupling mechanism, the upper coupling mechanisms on the seat bottom cushion corresponding with, and mating with, the lower coupling mechanisms on the seat base;
   retaining means for releasably fixing at least some of the upper coupling mechanisms to the corresponding lower coupling mechanisms;
   whereby the first bottom cushion can be selected and attached to the seat frame to customize the seat for a given user.

8. The bucket seat of claim 7 wherein the front end of the seat base does not extend forward of the front end of the bottom structure of shortest bottom cushion when the shortest bottom cushion is installed on the seat base.

9. The bucket seat of claim 7 wherein the set of interchangeable bottom cushions has a range of lengths differing by at least 4 inches, and the longest bottom cushion when installed on the seat base extends forward of the seat base by at least 4 inches.

10. The bucket seat of claim 9 wherein the set of interchangeable bottom cushions comprises:
    a first bottom cushion designed for a predetermined average-sized user;
    a second cushion that is approximately 1.5 inches shorter than the first cushion; and
    third, fourth, and fifth bottom cushions that are respectively approximately 1.5, 3.0, and 4.5 inches longer than the first cushion.

11. The automotive bucket seat of claim 7 wherein each of the coupling mechanisms is a longitudinally elongated rigid channel, each pair of an upper and a corresponding lower channel nest together; and the retaining means comprises elongated retaining pins that pass transversely through aligned holes in the left and right nested channels.

12. The automotive bucket seat of claim 7 wherein the upper coupling mechanisms comprise an upper left front fitting, an upper left back fitting, an upper right front fitting, and an upper right back fitting, the lower coupling mechanisms comprise fittings that correspond with, and mate with, the upper fittings, and the retaining means comprises elongated retaining pins, each of which passes transversely through aligned holes in both the left and right mated fittings.

13. The automotive bucket seat of claim 12 wherein the upper front left and upper front right fittings are male clevis fittings having a vertically elongated tongue with at least two generally vertically alternate holes for a retaining pin, and the lower front left and lower front right fittings are female clevis fittings with at least one hole for a retaining pin, whereby the front end of the seat bottom cushion can be attached to the seat base at an adjustable height relative to the seat base.

* * * * *